US011271967B2

(12) United States Patent
Borlick et al.

(10) Patent No.: US 11,271,967 B2
(45) Date of Patent: Mar. 8, 2022

(54) METHODS AND SYSTEMS FOR CYBER-HACKING DETECTION

(71) Applicant: International Business Machines Corporation, Armonk, NY (US)

(72) Inventors: Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/585,012

(22) Filed: May 2, 2017

(65) Prior Publication Data
US 2018/0324213 A1 Nov. 8, 2018

(51) Int. Cl.
| H04L 29/06 | (2006.01) |
| G06Q 20/40 | (2012.01) |
| G06N 20/00 | (2019.01) |
| G06F 21/55 | (2013.01) |
| G06Q 20/22 | (2012.01) |

(52) U.S. Cl.
CPC ........ H04L 63/1491 (2013.01); G06F 21/552 (2013.01); G06N 20/00 (2019.01); G06Q 20/227 (2013.01); G06Q 20/4016 (2013.01); H04L 63/1416 (2013.01); G06F 2221/2111 (2013.01)

(58) Field of Classification Search
CPC ............. H04L 63/1466; H04L 63/0245; H04L 67/306; G06F 21/554; G06F 21/552
See application file for complete search history.

(56) References Cited

U.S. PATENT DOCUMENTS

| 7,418,730 | B2 | 8/2008 | Chu et al. | |
| 10,102,570 | B1* | 10/2018 | Kapczynski | G06Q 40/02 |
| 2004/0098623 | A1* | 5/2004 | Scheidell | G06F 21/552 |
| | | | | 726/23 |
| 2013/0263226 | A1* | 10/2013 | Sudia | H04L 63/1466 |
| | | | | 726/4 |
| 2013/0312092 | A1* | 11/2013 | Parker | H04L 63/1408 |
| | | | | 726/22 |
| 2015/0326608 | A1* | 11/2015 | Shabtai | H04L 67/306 |
| | | | | 726/23 |
| 2015/0358336 | A1 | 12/2015 | Le Rouzic et al. | |
| 2017/0134423 | A1* | 5/2017 | Sysman | G06F 21/554 |
| 2018/0027006 | A1* | 1/2018 | Zimmermann | H04L 63/0245 |
| | | | | 726/11 |

OTHER PUBLICATIONS

Eric Alata et al., "Collection and Analysis of Attack Data Based on Honeypots Deployed on the Internet", HAL Id: hal-00140390, https://hal.archives-ouvertes.fr/hal-00140390, Apr. 6, 2007, pp. 15.

(Continued)

*Primary Examiner* — Joshua D Taylor
(74) *Attorney, Agent, or Firm* — Kunzler Bean & Adamson

(57) ABSTRACT

Methods and systems for cyber-hacking detection are provided. One method includes generating, by a processor, one or more artificial accounts for a type of actual account, learning one or more hacking behaviors for the type of actual account, and detecting cyber-hacks in activity in the one or more artificial accounts based on the one or more hacking behaviors. Systems and computer program products for performing the above method are also provided.

20 Claims, 7 Drawing Sheets

(56) References Cited

OTHER PUBLICATIONS

Imran Erguler, "Some Remarks on Honeyword based Password-Cracking Detection", IACR Cryptology ePrint Archive, 2014, pp. 22.

Dirk Hoffstadt et al., Analysis of SIP-Based Threats Using a VoIP Honeynet System, 2012 IEEE 11th International Conference on Trust, Security and Privacy in Computing and Communications, 2012, pp. 8.

\* cited by examiner

METHODS AND SYSTEMS FOR CYBER-HACKING DETECTION

FIELD

The subject matter disclosed herein relates to cyber-security and more particularly relates to methods and systems for cyber-hacking detection.

BACKGROUND

Recently, several businesses have been the victim of security breaches or cyber-hacking, which have resulted in a variety of losses. For example, cyber-hacking can generate nefarious transactions related to/associated with credit card accounts, debit card accounts, checking accounts, savings accounts, and the like financial accounts resulting in monies being fraudulently charged to and/or taken from these financial accounts. Other cyber-hacks have resulted in the loss or release of sensitive personal information for users/customers including, for example, name, contact information, user ID, password, email account, social media account, social security number, credit card account information, financial account information, and/or other important information that can be used to financially and/or personally harm an entities and/or individuals.

Sometimes, a cyber-hack may go undetected for a significant amount of time (e.g., months or years), which can increase the difficulty in determining who or what is responsible for the loss. Further, an undetected cyber-hack can make it difficult to determine the cause of the cyber-hack, the vulnerability that led to the cyber-hack, and/or the extent of the loss that resulted from the cyber-hack.

Various previous attempts to detect cyber-hacking have been based on using active user/customer accounts. Some other previous cyber-hacking detection measures attempt to lure or induce a cyber-hack using one or more active accounts in a scheme that is known as a honey pot or honey trap. While previous techniques can detect cyber-hacks, these techniques may include latency issues that often reduce their effectiveness.

BRIEF SUMMARY

Methods and systems for cyber-hacking detection are disclosed. One method includes generating, by a processor, one or more artificial accounts for a type of actual account, learning one or more hacking behaviors for the type of actual account, and detecting cyber-hacks in activity in the one or more artificial accounts based on the one or more hacking behaviors.

An apparatus includes a generation module for generating one or more artificial accounts for a type of account and a learning module for learning one or more hacking behaviors for the type of account. The apparatus further includes a detection module for detecting cyber-hacks in activity in the one or more artificial accounts based on the one or more hacking behaviors.

Also disclosed are computer program products including a computer-readable storage medium having program instructions embodied therewith. Various program instructions that are executable by a processor cause a processor to generate one or more artificial accounts for a type of actual account, learn one or more hacking behaviors for the type of actual account, and detect cyber-hacks in activity in the one or more artificial accounts based on the one or more hacking behaviors.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
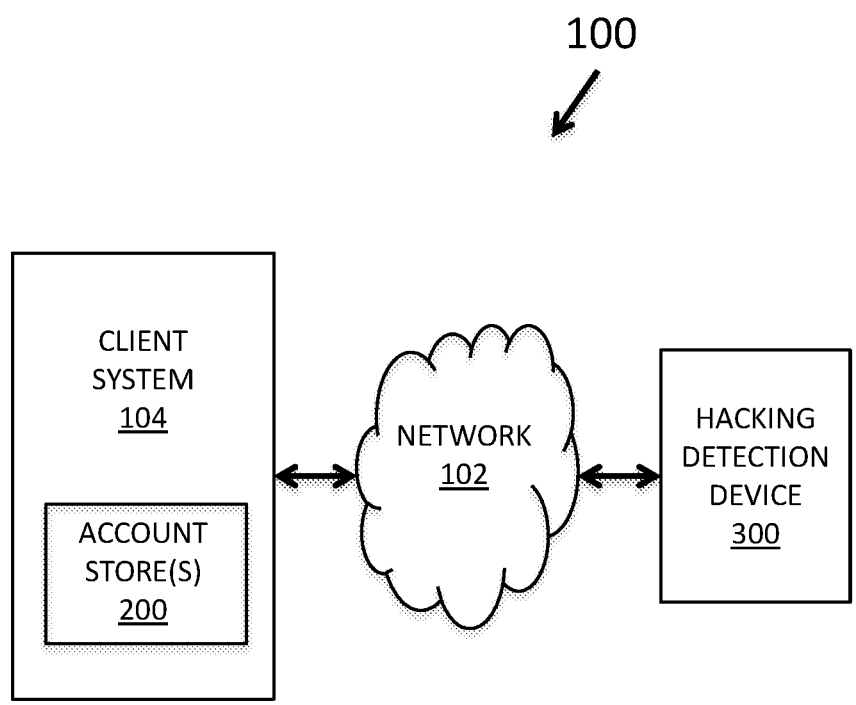
FIG. 1 is a schematic block diagram illustrating one embodiment of a computing system and/or computing network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Apparatus, systems, and methods for cyber-hacking detection are disclosed. One apparatus includes a generation module for generating one or more first artificial accounts for a first type of account, a learning module for learning one or more first hacking behaviors for the first type of account, and a detection module for detecting first cyber-hacks in first activity in the one or more first artificial accounts based on the one or more first hacking behaviors.

In various embodiments, the generation module groups the one or more first artificial accounts in a valid account store comprising a plurality of actual accounts for the first type of account. Further, the one or more first artificial accounts comprise a portion of the valid account store in the range of about one percent to about twenty-five percent.

The generation module, in some embodiments, generates one or more second artificial accounts related to/associated with one or more additional types of account in which each of the one or more additional type of account includes a respective second plurality of actual accounts. Here, the learning module is further configured to learn one or more second hacking behaviors for each second type of account and the detection module is further configured to detect second cyber-hacks in second activity in the one or more second artificial accounts based on the one or more second hacking behaviors.

In additional or alternative embodiments, the generation module further groups the one or more first artificial accounts and the one or more second artificial accounts in a valid account store including a first plurality of actual accounts and a second plurality of actual accounts for the first type of account. Further, the first plurality of actual accounts are managed by a first entity, the second plurality of actual accounts are managed by a second entity, and the detection module further distinguishes between a general cyber-hack based on the first type of account and a specific cyber-hack based on one of the first entity and the second entity.

The generation module, in further embodiments, groups the one or more first artificial accounts in a first valid account store comprising a first plurality of actual accounts for the first type of account and groups the one or more second artificial accounts in a second valid account store comprising a second plurality of actual accounts for the second type of account. Here, the first type of account and the second type of account are different types of account, the first plurality of actual accounts and the second plurality of actual accounts are managed by a same entity, and the detection module further distinguishes between a general cyber-hack based on the entity and a specific cyber-hack based on one of the first type of account and the second type of account.

Some embodiments further comprise Some embodiments further comprise a monitoring module for monitoring the one or more first artificial accounts for the first activity. Here, the first type of account is a financial account, the first activity is at least one of sign-in activity and transaction activity for the one or more first artificial accounts, and the detection module detects a first cyber-hack in response to an artificial account experiencing an attempt to at least one of sign-in to the artificial account and initiate a transaction associated with the artificial account.

In various embodiments, the learning module learns the one or more first hacking behaviors by learning one or more user behaviors based on first user activity for a plurality of actual accounts associated with the first type of account and determining that a deviation from the one or more user behaviors defines the one or more first hacking behaviors. In additional or alternative embodiments the learning module learns the one or more first hacking behaviors by learning the one or more first hacking behaviors from hacking activity associated with one or more hacked accounts.

Some embodiments further comprise a monitoring module for monitoring the one or more first artificial accounts for the first activity. Here, the first type of account is an email account, the first activity is at least one of sign-in activity and mailbox activity for the one or more first artificial accounts, the sign-in activity comprises at least one of one or more login dates, one or more real-world locations from which the one or more logins originated, and an IP number for each device utilized for the one or more logins, and the mailbox activity comprises email activity in at least one of a mail sent folder, a mail received folder, and a trash folder. For sign-in activity, the detection module determines a first cyber hack if the at least one of determined one or more login dates, the determined one or more real-world locations, and the determined IP number for each device does not match a corresponding at least one of one or more legitimate login dates, one or more real-world locations from which the one or more legitimate logins originated, and the IP number for each legitimate device utilized for the one or more actual logins. For mailbox activity, the detection module compares email activity in the at least one of the mail sent folder, the mail received folder, and the trash folder to known email activity in the at least one of the mail sent folder, the mail received folder, and the trash folder, and determines the first cyber hack if the email activity does not match the known activity.

A method includes generating, by a processor, one or more first artificial accounts for a first type of actual account, learning one or more first hacking behaviors for the first type of actual account, and detecting first cyber-hacks in first activity in the one or more first artificial accounts based on the one or more first hacking behaviors. In various embodiments, the method further includes grouping the one or more first artificial accounts in a valid account store comprising a plurality of actual accounts for the first type of accounts in which the one or more first artificial accounts comprise a portion of the valid account store in the range of about one percent to about twenty-five percent.

Some methods further include generating, by the processor, one or more second artificial accounts associated with one or more additional types of account in which each of the one or more additional type of account includes a respective second plurality of actual accounts. The method further includes learning one or more second hacking behaviors for each additional type of account and detecting second cyber-hacks in second activity in the one or more second artificial accounts based on the one or more second hacking behaviors.

In various embodiments, the method further includes grouping the one or more first artificial accounts and the one or more second artificial accounts in a valid account store comprising a first plurality of actual accounts and a second plurality of actual accounts for the first type of account in which the first plurality of actual accounts are managed by a first entity and the second plurality of actual accounts are managed by a second entity. Further, the method includes distinguishing between a general cyber-hack based on the first type of account and a specific cyber-hack based on one of the first entity and the second entity.

In some embodiments, the method includes grouping the one or more first artificial accounts in a first valid account store comprising a first plurality of actual accounts for the first type of account and grouping the one or more second artificial accounts in a second valid account store comprising a second plurality of actual accounts for an additional type of account in which the first type of account and the additional type of account are different types of account, and the first plurality of actual accounts and the second plurality of actual accounts are managed by a same entity. A method further includes distinguishing between a general cyber-hack based on the entity and a specific cyber-hack based on the first type of account and/or the additional type of account.

Learning the one or more first hacking behaviors, in some embodiments, includes learning one or more user behaviors based on user activity for a plurality of actual accounts associated with the first type of account, wherein a deviation from the one or more user behaviors defines the one or more first hacking behaviors. In additional or alternative embodiments, learning the one or more first hacking behaviors includes learning the one or more first hacking behaviors from hacking activity associated with one or more hacked accounts.

Also disclosed are computer program products comprising a computer-readable storage medium having program instructions embodied therewith. Some program instructions that are executable by a processor cause a processor to generate one or more first artificial accounts for a first type of actual account, learning one or more first hacking behaviors for the first type of actual account, and detecting first cyber-hacks in first activity in the one or more first artificial accounts based on the one or more first hacking behaviors.

In various embodiments, the method further includes grouping the one or more first artificial accounts in a valid account store comprising a plurality of actual accounts for the first type of accounts. Here, the one or more first artificial accounts comprise a portion of the valid account store in the range of about one percent to about twenty-five percent.

Various program instructions further cause the processor to generate one or more second artificial accounts associated with one or more additional types of account in which each of the one or more additional type of account includes a respective second plurality of actual accounts. Here, the program instructions further cause the processor to learn one or more second hacking behaviors for each additional type of account and detecting second cyber-hacks in second activity in the one or more second artificial accounts based on the one or more second hacking behaviors.

In various embodiments, the program instructions further cause the processor to group the one or more first artificial accounts and the one or more second artificial accounts in a valid account store comprising a first plurality of actual accounts and a second plurality of actual accounts for the first type of account in which the first plurality of actual accounts are managed by a first entity and the second plurality of actual accounts are managed by a second entity. Further, the program instructions further cause the processor to distinguish between a general cyber-hack based on the first type of account and a specific cyber-hack based on one of the first entity and the second entity.

In some embodiments, the program instructions further cause the processor to group the one or more first artificial accounts in a first valid account store comprising a first plurality of actual accounts for the first type of account and group the one or more second artificial accounts in a second valid account store comprising a second plurality of actual accounts for an additional type of account in which the first type of account and the additional type of account are different types of account and the first plurality of actual accounts and the second plurality of actual accounts are managed by a same entity. Some program instructions further cause the processor to distinguish between a general cyber-hack based on the entity and a specific cyber-hack based on the first type of account and/or the additional type of account.

In further embodiments, the program instructions causing the processor to learn the one or more first hacking behaviors further cause the processor to learn one or more user behaviors based on user activity for a plurality of actual accounts associated with the first type of account in which a deviation from the one or more first user behaviors defines the one or more first hacking behaviors. In additional or alternative embodiments, the program instructions causing the processor to learn the one or more first hacking behaviors further cause the processor to learn the one or more first hacking behaviors from hacking activity associated with one or more hacked accounts.

The description of elements in each figure below may refer to elements of proceeding figures. Like numbers refer to like elements in all figures, including alternate embodiments of like elements.

With reference now to the Figures, FIG. 1 is a schematic block diagram illustrating one embodiment of a computing system and/or computing network 100. At least in the illustrated embodiment, the computing network 100 includes, among other components, a network 102 coupling a client device and/or system 104 to a hacking detection system and/or device 300.

The network 102 may be any wired and/or wireless network (e.g., public and/or private computer networks in any number and/or configuration (e.g., the Internet, an intranet, a cloud network, etc.)) that is known or developed in the future that enables the client system 104 to be coupled to and/or in communication with the hacking detection device 200. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

The client system 104 can be any computing hardware and/or software device and/or system that is known or developed in the future that is capable of being accessed by the hacking detection device 300 via the network 102. The client device 104, as part of its operation, may receive input/output (I/O) requests from the hacking detection device 300 to detect if/when the client system 104 has been the victim of a cyber-hack, as discussed elsewhere herein. While FIG. 1 depicts the computing network 100 as including one client device 104, other embodiments may include more than one client device 104 such that the various embodiments of the computing network 100 are not limited to a single client device 104.

Access to the client device(s) 104 can be initiated by the hacking detection device 300 through a network socket (not shown) utilizing one or more inter-process networking techniques. In various embodiments, the client device(s) 104 and the hacking detection device 300 may comprise at least a portion of a client-server model.

Figure 2:
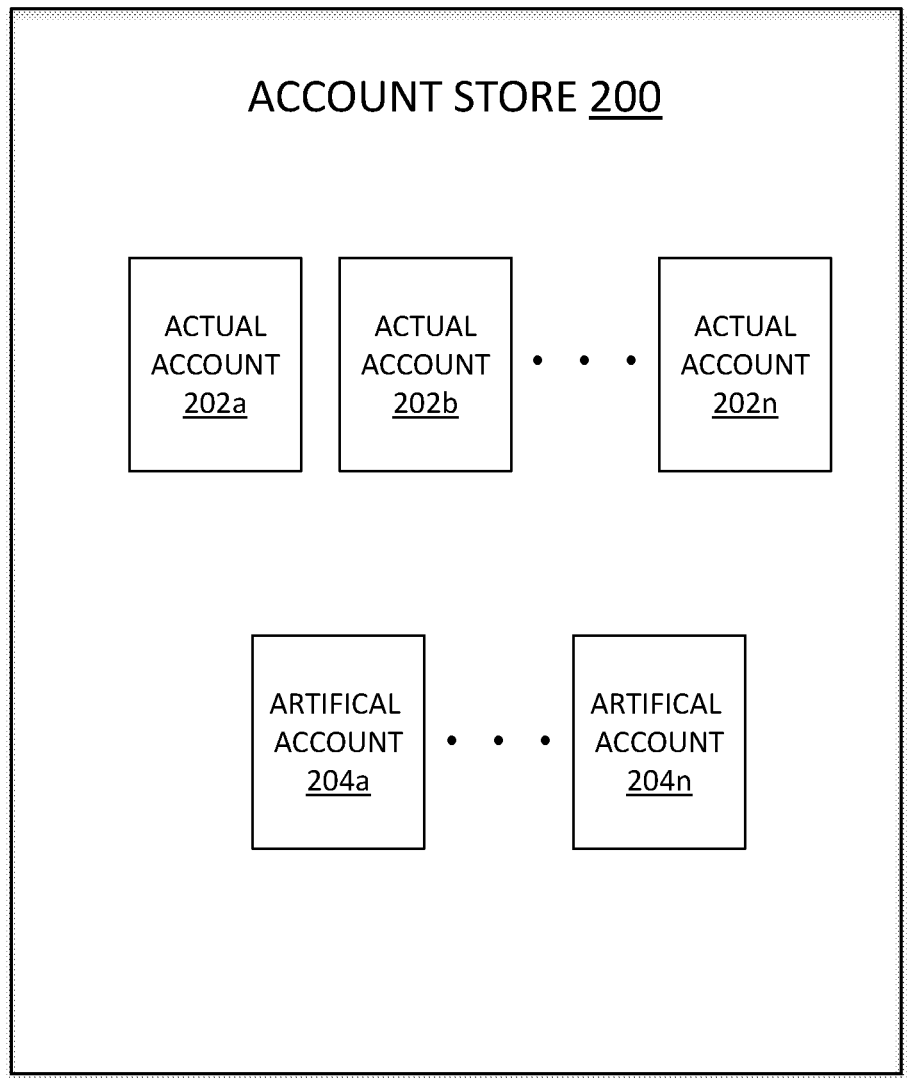
FIG. 2 is a diagram of one embodiment of an account store included in the computing system/network of FIG. 1.

The client system(s) 104 can include and/or host one or more account stores 200 created by the hacking detection device 300. With reference now to FIG. 2, the account store(s) 200 can include multiple actual accounts 202a, 202b, through 202n (also simply referred to individually, in various groups, or collectively, as actual account(s) 202) and one or more artificial accounts 204a through 204n (also simply referred to individually, in various groups, or collectively, as artificial account(s) 204).

The actual account(s) 202 may be any type of electronic account that is known or developed in the future. That is, the actual account(s) 202 may be real, authentic, and/or legitimate active accounts utilized by the client system(s) 104 and/or may be customer/user accounts that are managed by the client system(s) 104. In some embodiments, the actual accounts 202 are email accounts, while in other embodiments, the actual accounts 202 are financial accounts, among other possibilities that are contemplated herein. Examples of financial accounts include, but are not limited to, credit card accounts, debit accounts, bank accounts (e.g., checking accounts, savings accounts, etc.), gift card accounts, brokerage accounts, investment accounts, and/or retirement accounts, etc., among other types of financial accounts that are possible and contemplated herein.

The artificial account(s) 204, in various embodiments, are the same type of account as the actual account(s) 202 and may be used to assist in detection of cyber-hacks in the client device(s) 104 and/or in the actual accounts 202. For instance, each unique artificial account 204 can be mapped to a particular entity that owns, manages, and/or uses, or is otherwise associated with the artificial account(s) 204. Further, the artificial account(s) 204 include, for example, non-real, fake, dummy, non-authentic, and/or non-legitimate active accounts created/generated by the hacking detection device 300 that can be used as decoy, reference, and/or test accounts to determine whether one or more of the client devices 104 and/or one or more of the actual accounts 202 may have been and/or is currently the target of a cyber-hack. In various embodiments, one or more artificial accounts 204 include(s) unique artificial (e.g., fake, non-real, made-up, etc.) user information including, but not limited to, account holder name, user ID, email address, contact information, credit card information, and/or bank account information, etc., among other possible examples of information that allows the artificial account(s) 204 to mimic an actual account 202, each of which is contemplated herein. In additional or alternative embodiments, one or more artificial account(s) 204 include(s) a log that tracks the activity and/or transactions conducted on, received by, and/or attempted on, etc., the artificial account(s) 204, which activity and/or transactions can be used to determine hacking behavior and/or a target of a cyber-hack.

In some embodiments in which the actual accounts 202 are financial accounts, one or more artificial accounts 204 may be seeded with funds/monies and/or a credit limit so that the artificial accounts 204 mimic an actual account 202 that is a financial account. For example, an artificial account 204 may include and/or be seeded with a monetary balance so that when a hacker pings the artificial account 204 for an amount (e.g., a small amount) and/or debit transaction to test the validity of the artificial account 204, a withdrawal or transaction is completed, which gives the artificial account 204 the appearance of being a valid, active financial account. In another example, an artificial account 204 may be a credit card account including a credit limit so that when a hacker pings the artificial account 204 for an amount (e.g., a small amount) and/or credit transaction to test the validity of the artificial account 204, a purchase or transaction is completed, which gives the artificial account 204 the appearance of being a valid, active credit card account.

Any quantity and/or percentage of artificial accounts 204 in an account store 200 may be seeded with funds and/or credit limits in an effort to detect a cyber-hack since targeted accounts are often sold in baskets subsequent to conducting one or more low value and/or low volume transactions on potential target accounts to verify/ensure that the target accounts are valid and/or active accounts. In various embodiments, the percentage of artificial accounts 204 that are seeded with funds and/or credit limits is in the range of about ten percent (10%) to about one hundred percent (100%), although other ranges and/or percentages are possible and contemplated herein. That is, the quantity of artificial accounts 204 selected for seeding in an account store 200 can and/or should be an amount and/or percentage that provides a metric or estimate in determining whether one or more actual accounts 202 and/or entities associated with the actual account(s) 202 is the target of a cyber-hack via any account activity and/or attempts to conduct a transaction on the artificial account(s) 294, including transactions to withdraw/charge a test amount of money.

An account store 200 may include any quantity of actual accounts 202 and/or artificial accounts 204. Further, the artificial accounts 204 may comprise any percentage of the total number of accounts in an account store 200. In various embodiments, the artificial accounts 204 comprise a percentage of the total number of accounts in the account store 300 in the range of about one percent (1%) to about twenty-five percent (25%) with the actual accounts 202 comprising the remaining portion of an account store 200, although other ranges and/or percentages for the artificial accounts 204 and/or actual accounts 202 are possible and contemplated herein. Notably, the terms artificial account 204 and actual account 202 have been principally selected for readability and instructional purposes, and are not intended to limit the scope of the subject matter disclosed herein.

Figure 3A:
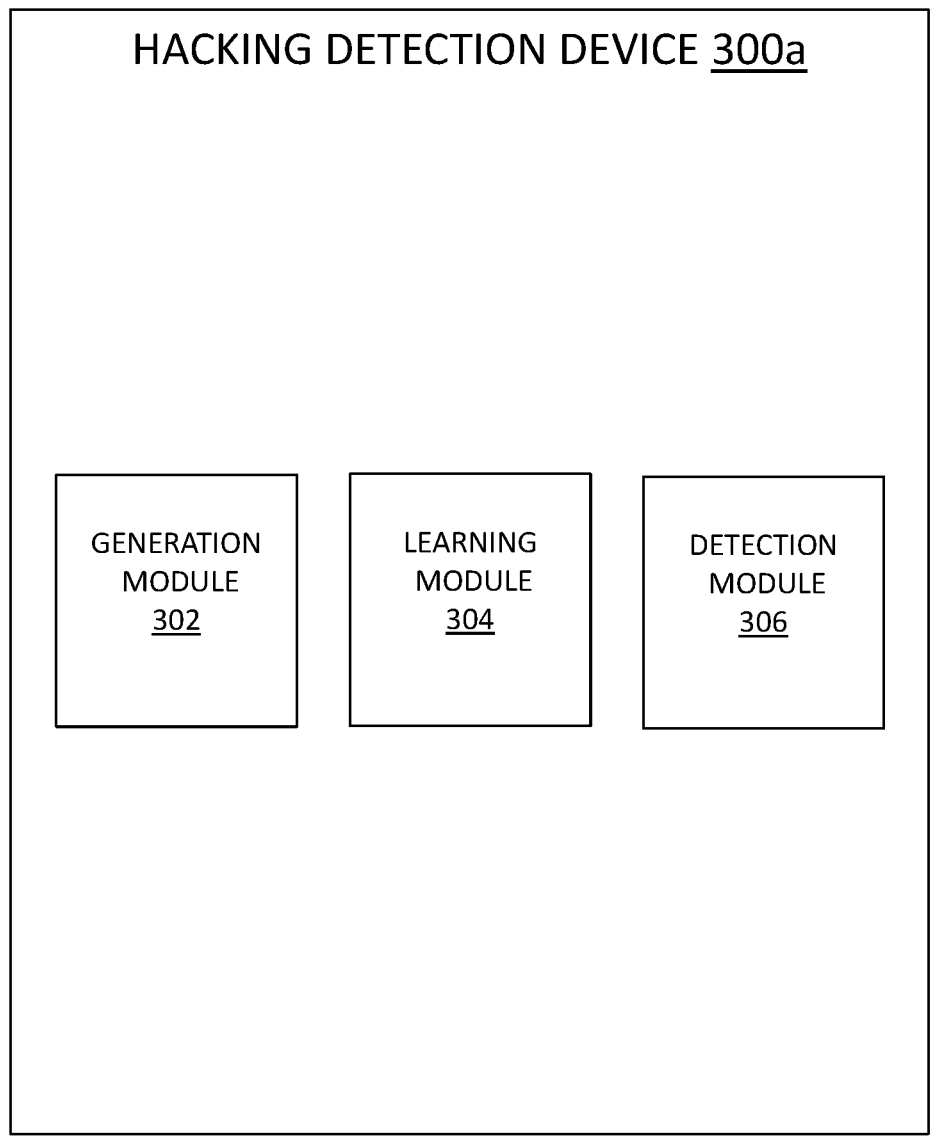
FIG. 3A is a block diagram illustrating one embodiment of a hacking detection device included in the computing system/network of FIG. 1.

With reference to FIG. 3A, FIG. 3A is a block diagram illustrating one embodiment of a hacking detection device 300a included in the computing network 100. The hacking detection device 300a includes hardware and/or software for cyber-hack detection. In some embodiments, the hacking detection device 300a includes a hardware and/or software application or app (e.g., Watson from IBM® Corporation of Armonk, N.Y.) that can be deployed in the computing network 100.

At least in the illustrated embodiment, the hacking detection device 300a includes, among other components, a generation module 302, a learning module 304, and a detection module 306. In various embodiments, the generation module 302 includes hardware and/or software to generate one or more artificial accounts 204 that mimic an actual account 202, as discussed elsewhere herein. In some embodiments, the hardware and/or software in the generation module 302 can further group one or more artificial accounts 204 and one or more actual accounts 202 to create, generate, and/or organize one or more account stores 200, as discussed elsewhere herein.

The learning module 304, in various embodiments, includes hardware and/or software to learn one or more hacking behaviors related to/associated with the one or more types of actual account 202 associated with the generated artificial account(s) 204 included in an account store 200. In some embodiments, the learning module 304 can analyze activity and/or transactions performed on one or more accounts that have previously been the target of a cyber-hack and create a set of hacking behaviors and/or parameters for a particular type of actual account 202 and/or entity associated with a type of actual account 202 based on the activity and/or transactions experienced by the hacked account(s).

Additionally or alternatively, the learning module 304, in various embodiments, includes hardware and/or software to learn one or more hacking behaviors for a particular type of actual account 202 and/or entity associated with a type of actual account 202 based on observing normal and/or legitimate activity related to/associated with the actual account 202 and/or entity. The hardware and/or software may include any type of machine learning and/or algorithm that is known or developed in the future. Examples of machine learning/algorithms include, but are not limited to, similarity/metric learning, supervised learning, unsupervised learning, semi-supervised learning, reinforcement learning, regression learning, clustered learning (clustering), decision tree learning, neural network learning, artificial neural network learning, deep learning, support vector machine (SVM) learning, Bayesian network learning, representation learning, inductive logic programming, association rule learning, learning classifier systems, rule-based learning, sparse dictionary learning, and/or genetic algorithms, etc., among other possible machine learning techniques/algorithms that are contemplated herein.

In various embodiments, the learning module 304 observes activity and/or transactions conducted on and/or performed by a particular type of actual account 202 and/or entity over a period of time, which may be any quantity and/or amount of time that enables the learning module 304 to determine/learn one or more characteristics constituting normal and/or legitimate activity/transactions for a particular type of actual account 204 and/or entity owning/using/managing the particular type of actual account 204. Example characteristics include, but are not limited to, an amount of activity (e.g., quantity of transactions), an amount of activity transpiring within a predetermined amount of time, activity occurring at particular times of the day, transaction amounts in monetary terms, quantity of logins, quantity of profile/password changes, the geographic locations where requests to perform a transaction originate, the Internet Protocol (IP) number of devices performing/requesting transactions, and/or accessibility and/or quantity of information associated with the actual accounts(s) 202 and/or entity on the Internet, etc., among other activity and/or information that is possible and contemplated herein.

For instance, normal and/or legitimate activity related to/associated with credit card accounts managed by a small entity might be different than normal and/or legitimate activity related to/associated with credit card accounts managed by a large entity. Further, normal and/or legitimate activity related to/associated with an email account for an individual might be different than normal and/or legitimate activity related to/associated with an email account for a large corporation. Moreover, normal and/or legitimate activity related to/associated with a retirement account might be different than normal and/or legitimate activity related to/associated with a checking account. Accordingly, responsive to viewing a quantity of activity and/or transactions over time performed on a particular type of actual account 202, the learning module 304 learns the types of activity and/or transactions that constitute normal and/or legitimate activity for that type of actual account 202.

The learning module 304, in some embodiments, can utilize the learned normal and/or legitimate activity to generate a set of parameters defining normal and/or legitimate activity, which can be extrapolated to learn and/or determine the hacking behavior(s) for a particular type of actual account 202 and/or entity. In some embodiments, the hacking behavior(s) may be defined as activity and/or transactions that is/are not included in the set of normal/legitimate parameters.

In alternative or additional embodiments, the learning module 304 may deem any activity and/or transaction directed to and/or attempted on an artificial account 204 as hacking behavior since an artificial account 204 has limited use and/or no real, legitimate user other than the hacking detection device 300. For example, an attempt to perform a credit card transaction on an artificial account 204 mimicking a credit card account would automatically define hacking behavior because the credit card transaction is, by definition, fraudulent since no individual and/or entity could have legitimately authorized a credit card transaction on an artificial account 204.

The detection module 306, in various embodiments, includes hardware and/or software to determine if activity directed to, performed on, and/or related to/associated with the artificial account(s) 204 constitutes hacking behavior. In various embodiments, the detection module 306 compares the activity directed to, performed on, and/or attempted on the artificial accounts 204 to the hacking behavior(s) and/or to the normal/legitimate parameters learned by the learning module 304 to determine if there is a match and/or mismatch, respectively.

In some embodiments, when the detected activity directed to, performed on, and/or attempted on an artificial account 204 matches the learned hacking behavior(s), the detection module 306 will deem the detected activity and/or transaction as hacking behavior and, in response thereto, determine that the artificial account 204 has been and/or is the target of a cyber-hack. In additional or alternative embodiments, when the detected activity directed to, performed on, and/or attempted on an artificial account 204 does not match any of the learned normal/legitimate parameter(s), the detection module 306 will deem the detected activity as being hacking behavior and, in response thereto, determine that the artificial account 204 has been and/or is the target of a cyber-hack. In further additional or alternative embodiments, the detection module 306 will deem any activity directed to, performed on, and/or attempted on an artificial account 204 as hacking behavior and, in response thereto, determine that the artificial account 204 has been and/or is the target of a cyber-hack. Activity and/or transactions that is/are not deemed to be hacking behavior is considered a legitimate activity and/or transaction and, in response thereto, the detection module 306 will not consider the artificial account 204 as not having been and/or is not the target of a cyber-hack.

Figure 3B:
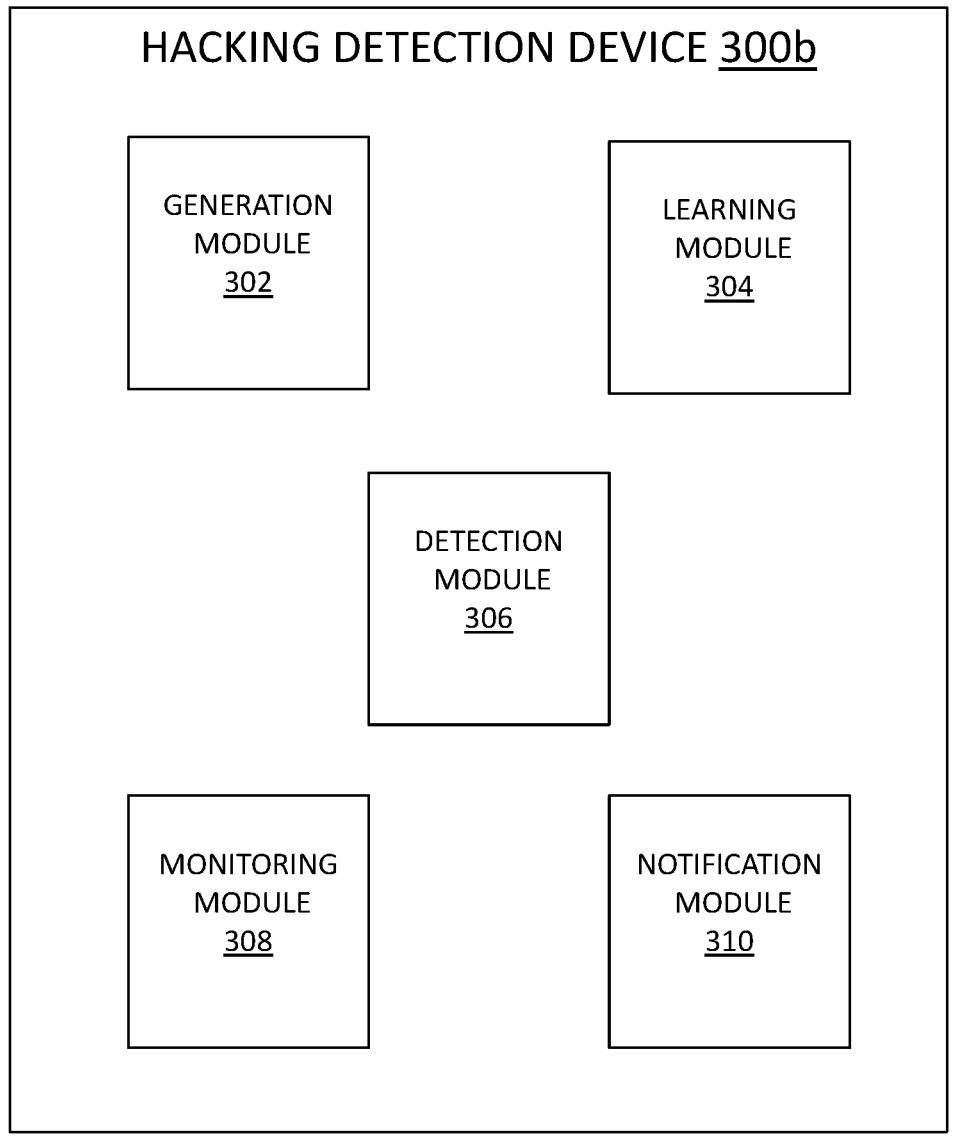
FIG. 3B is a block diagram illustrating another embodiment of a hacking detection device included in the computing system/network of FIG. 1.

With reference now to FIG. 3B, FIG. 3B illustrates another embodiment of a hacking detection device 300b included in the computing network 100. At least in the illustrated embodiment, the hacking detection device 300 includes, among other components, the generation module 302, the learning module 304, and the monitoring module 308 discussed above with reference to the hacking device 300a in FIG. 3A. The hacking device 300b further includes a monitoring module 308 and a notification module 310.

In various embodiments, the monitoring module 308 includes hardware and/or software to monitor and/or detect activity and/or transactions performed on and/or related to/associated with the artificial account(s) 204. Example activities/transactions include, but are not limited to, account login, an amount of activity, an amount of activity transpiring within a predetermined amount of time, activity occurring at particular times of the day, transaction amounts, number of transactions, quantity of profile/password changes, location of the originator of a request, the IP number of devices performing/requesting transactions in an account store 200, and/or searching the Internet for reference to an artificial account 204 and/or account store 200, etc., among other activity that is possible and contemplated herein. In some embodiments, the monitoring module 308 periodically logs in to the artificial account(s) 204 to read their respective logs of activity.

The following examples with reference to an artificial email account 204 may be helpful in understand the interaction of monitoring module 308 and detection module 306. The monitoring module 308 can link to the log of the artificial email account 204 to view and read all the recent sign-in activity, which may include login dates, the real-world geographic location that each login came from, and the IP number of each computer that logged in. The detection module 306 compares the log information with the login information that the detection knows is legitimate login activity (e.g., the login(s) performed by the monitoring module 308). If there is a login from a computer, geographic location (e.g., country, region, city, etc.), date, and/or time, etc., the detection module 306 will deem this login to be hacking behavior.

Additionally or alternatively, the monitoring module 308 can open the artificial email account's mailbox and navigate to the Sent Messages folder, which will show a list of the messages that have been sent from the artificial email account 204. The detection module 306 can determine hacking behavior if there are any messages that the hacking detection device 300 did not send. Further, the monitoring module 308 can also navigate to the Trash folder and the detection module 306 can determine hacking behavior if there any emails in the trash folder that that the hacking detection device 300 did not delete. Moreover, the monitoring module 308 can also navigate to the Inbox folder and the detection module 306 can determine hacking behavior if there any emails in the inbox folder that that the hacking detection device 300 did not send.

The notification module 310, in various embodiments, includes hardware and/or software to notify an entity owning, managing, and/or using one or more actual accounts 202 that is/are associated with an artificial account 204 determined to be the target of a cyber-hack of such cyber-hack. That is, responsive to a determination by the detection module 306 that an artificial account 204 in an account store 200 is being and/or has been the target of a cyber-hack, the notification module 310 notifies each entity owning, managing, and/or using an actual accounts 202 in the account store 200 of the cyber-hack. Notification may be provided utilizing any known or developed notification technique. Example notification techniques include, but are not limited to, email, an electronic alert, a telephonic communication, and/or a manual alert, etc., among other types of notification that are possible and contemplated herein.

Figure 4:
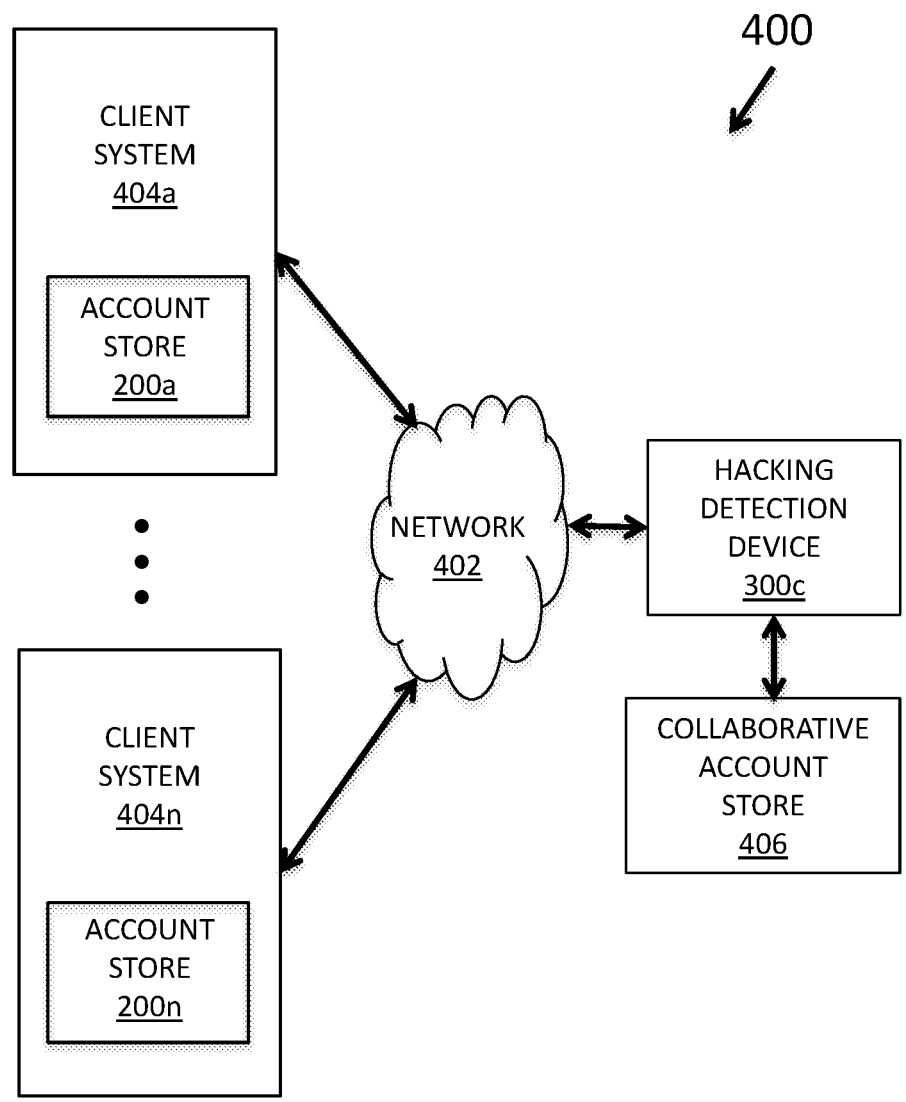
FIG. 4 is a schematic block diagram of another embodiment of a computing system and/or computing network.

With reference now to FIG. 4, FIG. 4 is a schematic block diagram of another embodiment of a computing system and/or computing network 400. At least in the illustrated embodiment, the computing network 400 includes, among other components, a network 402 coupling two or more client devices and/or systems 404a through 404n (also simply referred to individually, in various groups, or collectively, as client system(s) 400) to a hacking detection system and/or device 300c.

The various embodiments of the network 402 may be similar to the various embodiments of the network 102 discussed elsewhere herein. Further, the various embodiments of the client systems 404a through 404n may include an account store 200a through 200n (also simply referred to individually, in various groups, or collectively, as account store(s) 200), respectively, and may be similar to the various respective embodiments of the client system 204 and/or the account store 200, respectively, as discussed elsewhere herein. For instance, the hacking detection device 300 may group one or more of the sets of artificial accounts 204 that it generated and related/associated actual accounts 202 to create the valid account stores 200a through 200n in the client system(s) 404a and/or 404n.

In some embodiments, the client systems 404a through 404n are owned by different entities that manage and/or use the same type of actual accounts. For example, the client system 404a may be owned/managed/used by VISA® and the client system 404n may be owned/managed/used by MASTERCARD®. In other embodiments, the client systems 404a through 404n are owned by the same entity that manages and/or uses different types of actual accounts 202. For example, the client system 404a may manage/use checking accounts and the client system 404n, which is owned by the same entity as the client system 404a, may mange/use savings accounts, although other examples of entities and/or actual accounts 202 are possible and contemplated herein.

Some of the embodiments of the hacking detection device 300c may be similar to the various embodiments of the hacking detection devices 300a and/or 300b, as discussed elsewhere herein. For instance, the hacking detection device 300c may generate a set of artificial accounts 204 related to/associated with one or more actual accounts 202 managed/used by each of the client systems 404a and 404n, learn one or more hacking behaviors for each type of actual account 202 in the account stores 200a through 200n, monitor/detect the activity/transactions on each of the artificial accounts 204 in the account stores 200a through 200n, detect/determine cyber-hacks in the account stores 200a through 200n based on the monitored activity and/or the hacking behavior(s) detected in the artificial accounts 204 in the account stores 200a through 200n, and notify one or more of the client systems 404a through 404n of any cyber-hacks, as discussed elsewhere herein. That is, the hacking detection device 300c may generate a different set of artificial accounts 204 for each of the various types of actual accounts 202 included in the account stores 200a through 200n and/or for each of the entities managing/using the same type of actual account 202 in the account stores 200a through 200n. In continuing the above credit card example, the hacking detection device 300c may generate a first set of artificial accounts 204 related to/associated with the VISA® credit card accounts in the account store 200a and generate a second set of credit card accounts related to/associated with the MASTERCARD® credit card accounts in the account store 200n.

In various embodiments, the hacking detection device 300c may form a collaborative account store 406 by grouping together two or more valid account stores 200 and/or portions thereof. For instance, the hacking detection device 300c may treat two or more valid account stores 200 and/or portions thereof as a collaborative account store 406, which collaboration may be based on the type of actual account 202 and/or based on the entity, entities, and/or type of entity owning/managing/using the actual accounts 202. For example, different financial institutions may agree to allow the hacking detection device 300c to merge their respective account stores 200 and/or portions thereof to form a collaborative financial account store 406. In another example, different email service providers may agree to allow the hacking detection device 300c to merge their respective email account stores 200 and/or portions thereof to form a collaborative email account store 406. In another example, a financial institution may agree to allow the hacking detection device 300c to merge its individual retirement account (IRA) account store 200a and/or portion thereof and its 401(k) account store 200n to form a collaborative retirement account store 406.

In various embodiments, the hacking detection device 300c (e.g., via a learning module 304) can learn or figure out one or more hacking behaviors related to/associated with each type of actual account 202 included in a collaborative account store 406 and monitor the activity on each of the artificial accounts 204 similar to the hacking detection devices 300a and/or 300b discussed above. In some embodiments, the hacking detection device 300c can detect cyber-hacks based on the monitored/detected activity and/or the one or more learned hacking behaviors for the type(s) of actual accounts 202 included in a collaborative account store 406. Further, the hacking detection device 300c can differentiate between cyber-hacks directed to a particular actual account 202 and/or a particular entity and/or cyber-hacks generally directed to a particular type of actual account 202 and/or particular type of entity.

In various embodiments, the hacking detection device 300c compares the number of times that an artificial account 204 is accessed for one entity verses another entity to determine a normal pattern of access for the artificial accounts 204. If one entity has a greater quantity of hits compared to another entity of a similar type, the hacking detection device 300c can generate an alarm or notification for that entity.

In additional or alternative embodiments, the actual accounts 202 are monitored over a period of time and the frequency of access during this period of time is monitored so the hacking detection device 300c can learn/determine an expected hit ratio on the artificial accounts 204 for that period of time. If, within a same period/amount of time, the number of hits on an artificial account 204 is greater than N deviations from the expected hits and/or hit ratio, then the hacking detection device 300c will determine that the system and/or entity is the target of a cyber-hack and can generate an alarm or notification for the system and/or entity being targeted.

In various embodiments, the hacking detection device 300c may notify one or more client systems 404 of a cyber-hack that an artificial account 204 in a collaborative account store 406 has been and/or is the target of a cyber-hack. In some embodiments, the client system 404 including an actual account 202 with which an artificial account 204 is related/associated in the collaborative account store 406 is notified when hacking behavior is identified in the artificial account 204. In further embodiments, each client system 400 including an actual account 202 in the collaborative account store 406 is notified when hacking behavior is identified/determined in any artificial account 204 in the collaborative account store 406.

Figure 5:
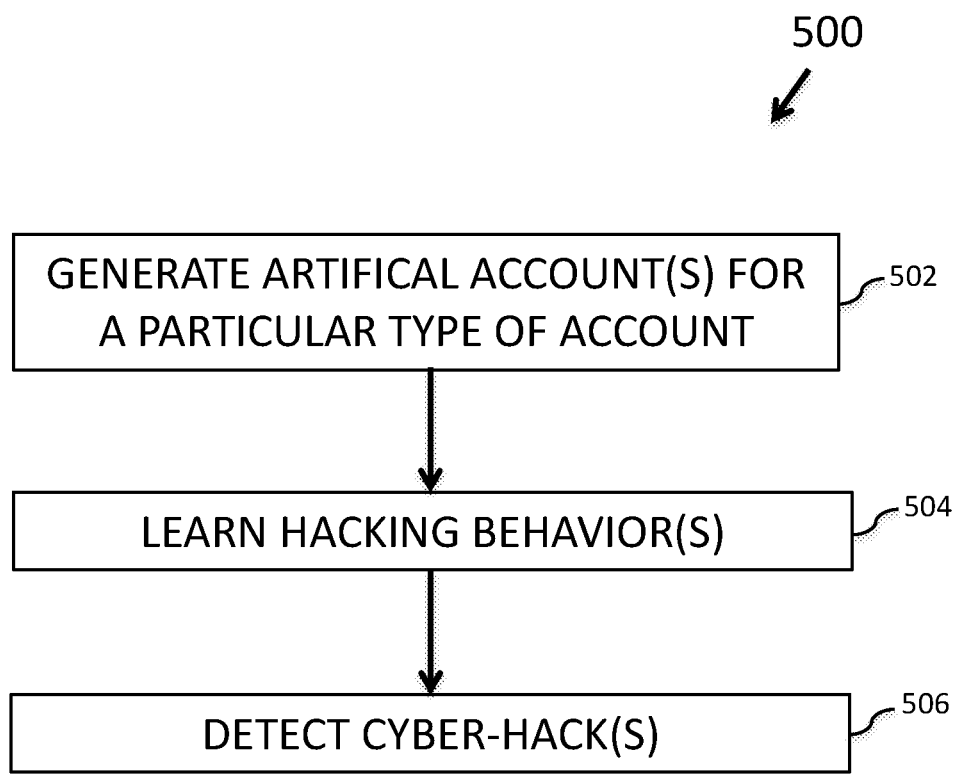
FIG. 5 is a flow diagram of one embodiment of a method for cyber-hacking detection.

With reference now to FIG. 5, FIG. 5 illustrates one embodiment of a method 500 for cyber-hacking detection. At least in the illustrated embodiment, method 500 begins by generating (e.g., by a generation module 302 in a hacking detection device 300a/300b/300c) a set of artificial accounts 204 (block 502). In various embodiments, the artificial account(s) 204 are related to/associated with one or more actual accounts 202, which can be the same or different types of actual accounts 202, that managed/used by one or more client systems 104 which may be owned by the same or different entities, as discussed elsewhere herein.

A learning module 304 in the hacking detection device 300 learns one or more hacking behaviors for each type of actual account 202 (block 504). The hacking behavior(s) may be learned by observing normal/legitimate activity performed on one or more actual accounts 202 and/or by analyzing the activity and/or transactions performed on one or more accounts that have previously been the target of a cyber-hack, as discussed elsewhere herein.

A detection module 306 can detect cyber-hacks based on the learned hacking behavior(s) (block 506). The hacking behavior(s) may be determined when activity in an artificial account 204 matches learned hacking behavior and/or does not match one or more parameters/metrics defining normal activity, as discussed elsewhere herein.

Figure 6:
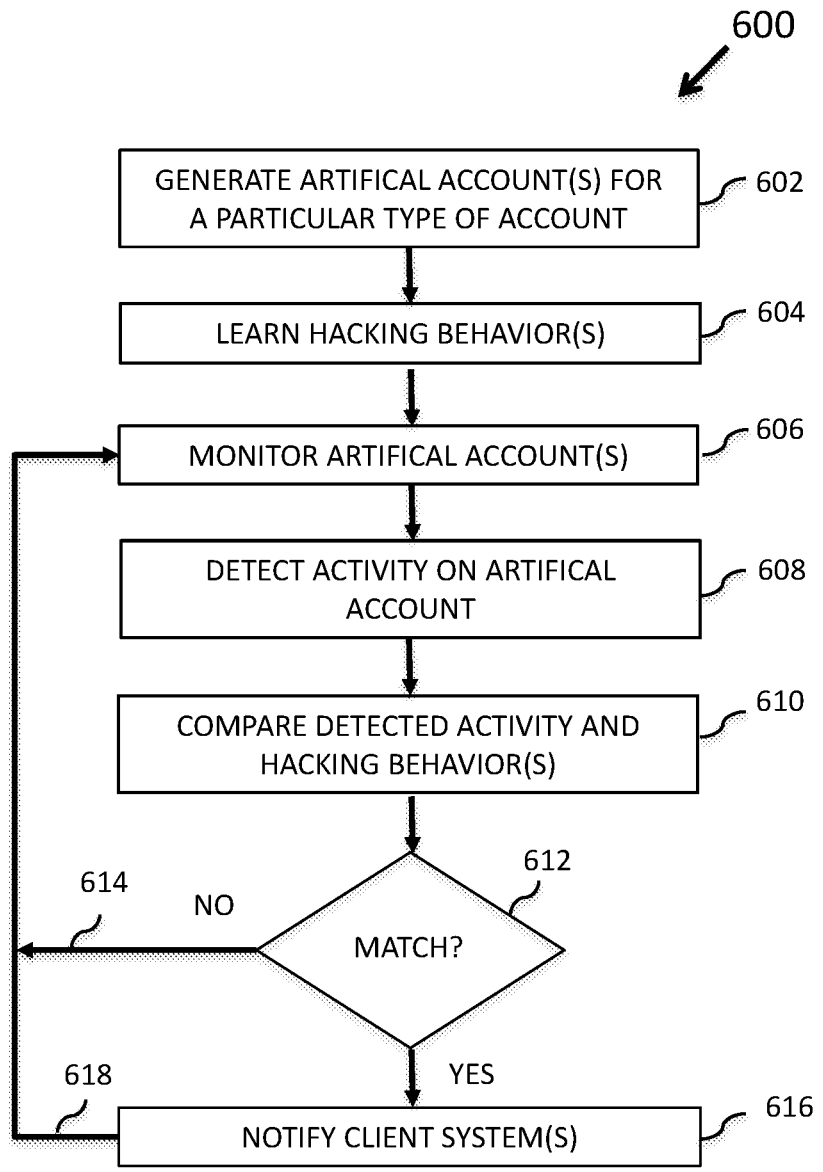
FIG. 6 is a flow diagram of another embodiment of a method for cyber-hacking detection.

Referring now to FIG. 6, FIG. 6 illustrates another embodiment of a method 600 for cyber-hacking detection. At least in the illustrated embodiment, method 600 begins by generating (e.g., by a generation module 302 in a hacking detection device 300) a set of artificial accounts 204 (block 602). In various embodiments, the artificial account(s) 204 are related to/associated with one or more actual accounts 202, which can be the same or different types of actual accounts 202, that managed/used by one or more client systems 104 which may be owned by the same or different entities, as discussed elsewhere herein.

A learning module 304 in the hacking detection device 300 learns one or more hacking behaviors for each type of actual account 202 (block 604). The hacking behavior(s) may be learned by observing normal/legitimate activity performed on one or more actual accounts 202 and/or by analyzing the activity and/or transactions performed on one or more accounts that have previously been the target of a cyber-hack, as discussed elsewhere herein.

A monitoring module 308 in the hacking detection device 300 monitors the activity and/or transactions performed on each artificial account 204 (block 606) and a detection module 306 can detect cyber-hacks based on the monitored activity in conjunction with the learned hacking behavior(s) (block 608). That is, the detection module compares the monitored activity and the hacking behavior(s) (block 610) and can determine a match based on the comparison (block 612).

Responsive to the monitored activity not matching the hacking behavior(s), (e.g., a NO), the monitoring module 308 can continue monitoring the activity and/or transactions being performed on the artificial account(s) 204 and blocks 606 through 612 may be repeated (return 614). Responsive to a match (e.g., a YES), the client system(s) 104 is/are notified (e.g., by a notification module 310 in the hacking detection device 300) of any suspected and/or actual cyber-hacks and/or hacking behavior identified by the detection module 306 (block 616). The monitoring module 308 may then continue monitoring the activity and/or transactions being performed on the artificial account(s) 204 and blocks 606 through 616 may be repeated (return 618).

Using one or more artificial accounts 204 to determine whether a cyber-hack is occurring and/or has occurred allows the various embodiments discussed herein to maintain the privacy of account holders and/or entities owning, managing/using actual accounts 202. That is, user and/or entity privacy can be maintained because the various embodiments do not rely on any information related to actual/real user accounts for detecting a cyber-hack. In other words, since the information used to determine a cyber-hack is based on one or more artificial accounts 204 that do not correspond to an actual person, the various embodiments discussed herein produce less privacy concerns. As such, because business entities would rightly not want to send information about actual customers that may affected by a cyber-hack, the various embodiments allow business entities to be more free to share information about artificial accounts 204 that do not correspond to actual people.

Further, since the definition of abnormal or illegitimate activity for an artificial account 204 can be less than that for an actual account 202, the cost of monitoring artificial accounts 204 for a breach and/or theft is much lower and does not or reduces the number of false positives. Moreover, monitoring artificial accounts 204 instead of actual accounts 202 is more accurate and/or less involved because actual accounts 204 may require monitoring and filtering a large number of transactions per second, whereas artificial accounts 204 may have significantly less traffic.

The embodiments may be practiced in other specific forms. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus, comprising:
   a generation module for generating one or more first artificial accounts for a first type of account, wherein the one or more first artificial accounts are each configured to mimic an actual account for the first type of account when interacting with external entities so that the one or more first artificial accounts have the appearance of a valid account of the first type of account to an external entity interacting with the one or more first artificial accounts and so that a set of first hacking behaviors for the first type of account are detectable in actual activity between one or more first actual accounts and the external entity;
   a learning module for automatically learning the set of first hacking behaviors for the first type of account by:
      automatedly analyzing first activity performed by an authorized user on each of one or more first actual accounts of the first type of account that are known to have not been previously hacked to learn a first set of characteristics in the first activity,
      defining the learned first set of characteristics as legitimate activity for the first type of account,
      automatedly analyzing second activity associated with one or more second actual accounts of the first type of account that are known to have been previously hacked to learn a second set of characteristics in the second activity,
      defining the learned second set of characteristics as non-legitimate activity for the first type of account, wherein the second set of characteristics in the second activity are different than and deviate from the first set of characteristics in the first activity performed by the authorized user defining the legitimate activity for the first type of account for each of the one or more first actual accounts,
      utilizing the learned first set of characteristics to generate a first set of parameters to identify legitimate activity for the first type of account based on the learned first set of characteristics,
      utilizing the learned second set of characteristics to generate a second set of parameters that are different than and/or deviate from the legitimate activity defined for the first type of account to identify non-legitimate activity for the first type of account based on the learned second set of characteristics, and
      defining the set of first hacking behaviors as including a third set of characteristics comprising:
         any activity that does not match the first set of parameters that identify the legitimate activity for the first type of account,
         any activity that matches any portion of the second set of parameters that identify the non-legitimate activity for the first type of account, and
         any activity that is different than and/or deviates from the legitimate activity performed by the authorized user for each of the one or more first actual accounts utilized to define the non-legitimate activity for the first type of account; and
   a detection module for detecting first cyber-hacks in the first type of account by:
      for the one or more first artificial accounts, determining that a cyber-hack is occurring in the first type of account in response to detecting any activity occurring on the one or more first artificial accounts by the external entity, and
      for the one or more first actual accounts, comparing a fourth set of characteristics in the actual activity performed by the external entity in interacting with the one or more first actual accounts and the third set of characteristics defining the set of first hacking behaviors to determine a match, determining that the cyber-hack is occurring in the first type of account in response to any activity in the fourth set of characteristics in the actual activity between the one or more first actual accounts and the external entity matching any of the activities in the third set of characteristics defining the set of first hacking behaviors, and determining that the cyber-hack is not occurring in the first type of account in response to determining that all of the activity in the fourth set of characteristics in the actual activity between the one or more first actual accounts and the external entity matches at least one of the activities in the third set of characteristics defining the set of first hacking behaviors.

2. The apparatus of claim 1, wherein:
the generation module further groups the one or more first artificial accounts in a valid account store comprising a plurality of actual accounts for the first type of account; and
the one or more first artificial accounts and the plurality of actual accounts appear the same to an external entity interacting with the one or more first artificial accounts and the plurality of actual accounts.

3. The apparatus of claim 2, wherein the one or more first artificial accounts comprise a portion of the valid account store in the range of one percent to twenty-five percent.

4. The apparatus of claim 1, wherein:
the generation module further generates one or more second artificial accounts associated with one or more additional types of account;
each of the one or more additional type of account includes a respective second plurality of actual accounts;
the learning module further learns one or more second hacking behaviors for each second type of account; and
the detection module further detects second cyber-hacks in second activity in the one or more second artificial accounts based on the one or more second hacking behaviors.

5. The apparatus of claim 4, wherein:
the generation module further groups the one or more first artificial accounts and the one or more second artificial accounts in a valid account store comprising a first plurality of actual accounts and a second plurality of actual accounts for the first type of account;
the first plurality of actual accounts are managed by a first entity;
the second plurality of actual accounts are managed by a second entity; and
the detection module further distinguishes between a general cyber-hack and a specific cyber-hack,
wherein:
the general cyber-hack is detected based on a first frequency of access for the first type of account, and
the specific cyber-hack is detected based on one of a second frequency of access for the first entity and a third frequency of access for the second entity.

6. The apparatus of claim 4, wherein:
the generation module further:
groups the one or more first artificial accounts in a first valid account store comprising a first plurality of actual accounts for the first type of account, and
groups the one or more second artificial accounts in a second valid account store comprising a second plurality of actual accounts for the second type of account;
the first type of account and the second type of account are different types of account;
the first plurality of actual accounts and the second plurality of actual accounts are managed by a same entity; and
the detection module further distinguishes between a general cyber-hack and a specific cyber-hack,
wherein:
the general cyber-hack is detected based on a first frequency of access for the entity, and
the specific cyber-hack is detected based on one of a second frequency of access for the first type of account and a third frequency of access for the second type of account.

7. The apparatus of claim 1, further comprising:
a monitoring module for monitoring the one or more first artificial accounts for the first activity, wherein:
the first type of account is a financial account,
the first activity is at least one of sign-in activity and transaction activity for the one or more first artificial accounts, and
the detection module detects a first cyber-hack in response to an artificial account experiencing the one or more first hacking behaviors.

8. The apparatus of claim 1, further comprising:
a monitoring module for monitoring the one or more first artificial accounts for the first activity, wherein:
the first type of account is an email account,
the first activity is at least one of sign-in activity and mailbox activity for the one or more first artificial accounts,
the sign-in activity comprises at least one of one or more login dates, one or more real-world locations from which the one or more logins originated, and an internet protocol (IP) number for each device utilized for the one or more logins,
the mailbox activity comprises email activity in at least one of a mail sent folder, a mail received folder, and a trash folder,
for sign-in activity, the detection module determines a first cyber hack if the at least one of determined one or more login dates, the determined one or more real-world locations, and the determined IP number for each device matches the one or more first hacking behaviors, and
for mailbox activity, the detection module:
compares email activity in the at least one of the mail sent folder, the mail received folder, and the trash folder to known email activity in the at least one of the mail sent folder, the mail received folder, and the trash folder, and
determines the first cyber hack if the email activity matches the one or more first hacking behaviors.

9. A method, comprising:
generating, by a processor, one or more first artificial accounts for a first type of actual account, wherein the one or more first artificial accounts are each configured to mimic an actual account for the first type of account when interacting with external entities so that the one or more first artificial accounts have the appearance of a valid account of the first type of account to an external entity interacting with the one or more first artificial accounts and so that a set of first hacking behaviors for the first type of account are detectable in actual activity between one or more first actual accounts and the external entity;
automatedly learning, by the processor, the set of first hacking behaviors for the first type of actual account by:
automatedly analyzing first activity performed by an authorized user on each of one or more first actual accounts of the first type of account that are known to have not been previously hacked to learn a first set of characteristics in the first activity, defining the learned first set of characteristics as legitimate activity for the first type of account, automatedly analyzing second activity associated with one or more actual second accounts of the first type of account that are known to have been previously hacked to learn a second set of characteristics in the second activity, defining the learned second set of characteristics as non-legitimate activity for the first type of account, wherein the second set of characteristics in the second activity are different than and deviate from the first set of characteristics in the first activity performed by the authorized user defining the legitimate activity for the first type of account for each of the one or more first actual accounts, utilizing the learned first set of characteristics to generate a first set of parameters to identify legitimate activity for the first type of account based on the first set of characteristics, utilizing the learned second set of characteristics to generate a second a set of parameters that are different than and/or deviate from the legitimate activity defined for the first type of account to identify non-legitimate activity for the first type of account based on the second set of characteristics, and defining the set of first hacking behaviors as including a third set of characteristics comprising:
  any characteristic in any activity that does not match the first set of parameters that identify the legitimate activity for the first type of account,
  any characteristic in any activity that matches any portion of the second set of parameters that identify the non-legitimate activity for the first type of account, and
  any activity that is different than and/or deviates from the legitimate activity performed by the authorized user for each of the one or more first actual accounts utilized to define the non-legitimate activity for the first type of account; and detecting first cyber-hacks in the first type of account by:
  for the one or more first artificial accounts, determining that a cyber-hack is occurring in the first type of account in response to detecting any activity occurring on the one or more first artificial accounts by the external entity, and
  for the one or more first actual accounts, comparing a fourth set of characteristics in the actual activity performed by the external entity in interacting with the one or more first actual accounts and the third set of characteristics defining the set of first hacking behaviors to determine a match, determining that the cyber-hack is occurring in the first type of account in response to any activity in the fourth set of characteristics in the actual activity between the one or more first actual accounts matching any of the activities in the third set of characteristics defining the set of first hacking behaviors, and determining that the cyber-hack is not occurring in the first type of account in response to determining that all of the activity in the fourth set of characteristics in the actual activity between the one or more first actual accounts and the external entity matches at least one of the activities in the third set of characteristics defining the set of first hacking behaviors.

10. The method of claim 9, further comprising:
grouping the one or more first artificial accounts in a valid account store comprising a plurality of actual accounts for the first type of account, wherein the one or more first artificial accounts comprise a portion of the valid account store in the range of one percent to twenty-five percent.

11. The method of claim 9, further comprising:
generating, by the processor, one or more second artificial accounts associated with one or more additional types of account, wherein each of the one or more additional type of account includes a respective second plurality of actual accounts;

learning one or more second hacking behaviors for each additional type of account; and detecting second cyber-hacks in second activity in the one or more second artificial accounts based on the one or more second hacking behaviors.

12. The method of claim 11, further comprising:
grouping the one or more first artificial accounts and the one or more second artificial accounts in a valid account store comprising a first plurality of actual accounts and a second plurality of actual accounts for the first type of account, wherein the first plurality of actual accounts are managed by a first entity and the second plurality of actual accounts are managed by a second entity; and distinguishing between a general cyber-hack based on the first type of account and a specific cyber-hack based on one of the first entity and the second entity.

13. The method of claim 11, further comprising:
grouping the one or more first artificial accounts in a first valid account store comprising a first plurality of actual accounts for the first type of account;

grouping the one or more second artificial accounts in a second valid account store comprising a second plurality of actual accounts for an additional type of account, wherein the first type of account and the additional type of account are different types of account, and the first plurality of actual accounts and the second plurality of actual accounts are managed by a same entity; and distinguishing between a general cyber-hack based on the entity and a specific cyber-hack based on one of the first type of account and the additional type of account.

14. The method of claim 9, further comprising:
monitoring the one or more first artificial accounts for the first activity, wherein:
  the first type of account is a financial account, and
  the first activity is at least one of sign-in activity and transaction activity for the one or more first artificial accounts; and detecting a first cyber-hack in response to an artificial account experiencing the one or more first hacking behaviors.

15. The method of claim 9, further comprising:
monitoring the one or more first artificial accounts for the first activity, wherein:
  the first type of account is an email account,
  the first activity is at least one of sign-in activity and mailbox activity for the one or more first artificial accounts,
  the sign-in activity comprises at least one of one or more login dates, one or more real-world locations from which the one or more logins originated, and an internet protocol (IP) number for each device utilized for the one or more logins,
  the mailbox activity comprises email activity in at least one of a mail sent folder, a mail received folder, and a trash folder, for sign-in activity, determining a first cyber hack if the at least one of determined one or more login dates, the determined one or more real-world locations, and the determined IP number for each device matches the one or more first hacking behaviors, and for mailbox activity, detecting comprises:
comparing email activity in the at least one of the mail sent folder, the mail received folder, and the trash folder to known email activity in the at least one of the mail sent folder, the mail received folder, and the trash folder, and determining the first cyber hack if the email activity matches the one or more first hacking behaviors.

16. A computer program product comprising a computer readable storage medium having program instructions embodied therewith, the program instructions executable by a processor to cause the processor to:

generate one or more first artificial accounts for a first type of actual account, wherein the one or more first artificial accounts are each configured to mimic an actual account for the first type of account when interacting with external entities so that the one or more first artificial accounts have the appearance of a valid account of the first type of account to an external entity interacting with the one or more first artificial accounts and so that a set of first hacking behaviors for the first type of account are detectable in actual activity between one or more first actual accounts and the external entity;

automatedly learn the set of first hacking behaviors for the first type of actual account by:
automatedly analyzing first activity performed by an authorized user on each of one or more first actual accounts of the first type of account that are known to have not been previously hacked to learn a first set of characteristics in the first activity, defining the learned first set of characteristics as legitimate activity for the first type of account, automatedly analyzing second activity associated with one or more second actual accounts of the first type of account that are known to have been previously hacked to learn a second set of characteristics in the second activity, defining the learned second set of characteristics as non-legitimate activity for the first type of account, wherein the second set of characteristics in the second activity are different than and deviate from the first set of characteristics in the first activity performed by the authorized user defining the legitimate activity for the first type of account for each of the one or more first actual accounts, utilizing the learned first set of characteristics to generate a first set of parameters to identify legitimate activity for the first type of account based on the learned first set of characteristics, utilizing the learned second set of characteristics to generate a second set of parameters that are different than and/or deviate from the legitimate activity for the first type of account to identify non-legitimate activity for the first type of account based on the learned second set of characteristics, and defining the set of first hacking behaviors as including a third set of characteristics comprising:
any characteristic in any activity that does not match the first set of parameters that identify the legitimate activity for the first type of account, any characteristic in any activity that matches any portion of the second set of parameters that identify the non-legitimate activity for the first type of account, and any activity that is different than and/or deviates from the legitimate activity performed by the authorized user for each of the one or more first actual accounts utilized to define the non-legitimate activity for the first type of account; and detect first cyber-hacks in the first type of account by:
for the one or more first artificial accounts, determining that a cyber-hack is occurring in the first type of account in response to detecting any activity occurring on the one or more first artificial accounts by the external entity, and for the one or more first actual accounts, comparing a fourth set of characteristics in the actual activity performed by the external entity in interacting with the one or more first actual accounts and the third set of characteristics defining the set of first hacking behaviors to determine a match, determining that the cyber-hack is occurring in the first type of account in response to any activity in the fourth set of characteristics in the actual activity between the one or more first actual accounts and the external entity matching any of the activities in the third set of characteristics defining the set of first hacking behaviors, and determining that the cyber-hack is not occurring in the first type of account in response to determining that all of the activity in the fourth set of characteristics in the actual activity between the one or more first actual accounts and the external entity matches at least one of the activities in the third set of characteristics defining the set of first hacking behaviors.

17. The computer program product of claim 16, wherein the program instructions further cause the processor to:
group the one or more first artificial accounts in a valid account store comprising a plurality of actual accounts for the first type of account, wherein the one or more first artificial accounts comprise a portion of the valid account store in the range of one percent to twenty-five percent.

18. The computer program product of claim 17, wherein the program instructions further cause the processor to:
generate one or more second artificial accounts associated with one or more additional types of account, wherein each of the one or more additional type of account includes a respective second plurality of actual accounts;

learn one or more second hacking behaviors for each additional type of account; and detect second cyber-hacks in second activity in the one or more second artificial accounts based on the one or more second hacking behaviors.

19. The computer program product of claim 17, wherein the program instructions further cause the processor to:
group the one or more first artificial accounts in a first valid account store comprising a first plurality of actual accounts for the first type of account;

group the one or more second artificial accounts in a second valid account store comprising a second plurality of actual accounts for an additional type of account, wherein the first type of account and the additional type of account are different types of account, and the first plurality of actual accounts and the second plurality of actual accounts are managed by a same entity; and distinguish between a general cyber-hack based on the entity and a specific cyber-hack based on one of the first type of account and the additional type of account.

20. The computer program product of claim 16, wherein the program instructions further cause the processor to:

monitor the one or more first artificial accounts for the first activity, wherein:
 the first type of account is a financial account, and
 the first activity is at least one of sign-in activity and transaction activity for the one or more first artificial accounts; and detect a first cyber-hack in response to an artificial account experiencing the one or more first hacking behaviors.

\* \* \* \* \*